April 24, 1951 F. M. SHOEMAKER 2,550,607
ELECTRONIC METAL DETECTOR
Filed Feb. 13, 1948

Frank M. Shoemaker INVENTOR.

BY William D. Carothers
his Attorney

Patented Apr. 24, 1951

2,550,607

UNITED STATES PATENT OFFICE 2,550,607

ELECTRONIC METAL DETECTOR

Frank M. Shoemaker, Pittsburgh, Pa.

Application February 13, 1948, Serial No. 8,141

2 Claims. (Cl. 175—183)

1

This invention relates generally to metal detecting and more particularly to the method and apparatus for detecting metals in building construction.

During the process of construction of buildings one or more contractors and their workmen are employed to construct parts of the building of which they are particularly skilled and even though the plans require the proper location of metal columns, beams, pipe, conduit, electrical outlets and other similar materials employed in the building they frequently cover the same by cement, plaster or other wall and ceiling coverings and it is quite difficult, if not impossible, to relocate the metal parts particularly after the walls have been constructed and the structural work is enclosed. It is the ordinary practice to refer to the plans and guess where the metal parts are and then destroy a portion of the surface of the building in an attempt to find such metal parts.

The principal object of this invention is the provision of a portable electronic apparatus designed to indicate the exact location of a hidden metal part.

Another object is the provision of a new and novel electronic circuit for indicating the exact location of a hidden metal part.

Another object is the provision of an electronic detector for locating objects such as electrical outlets covered by plaster by showing a maximum coupling indication when centered over the object.

Another object is the provision of an electronic detector assembled in an enclosure permitting the replacement of the vacuum tube and batteries without disturbing the circuit.

Another object is the provision of a tuned electronic triode indicating circuit wherein the indication is obtained by opposed electronic flow.

Other objects and advantages appear hereinafter in the following description and claims.

A practical embodiment illustrating the principles of this invention is disclosed in the accompanying drawing wherein.

Figure 1:
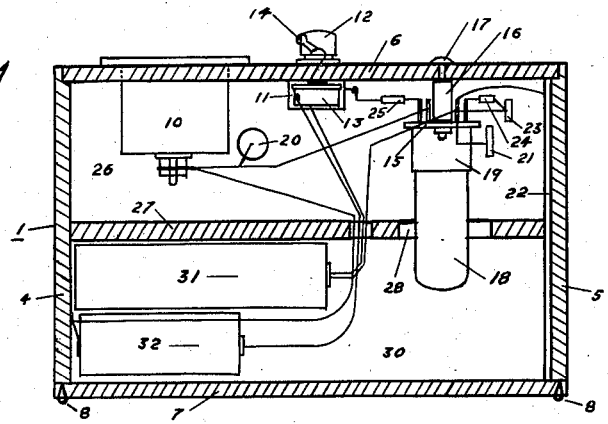
Fig. 1 is a view in section of the apparatus comprising this invention.
Figure 2:
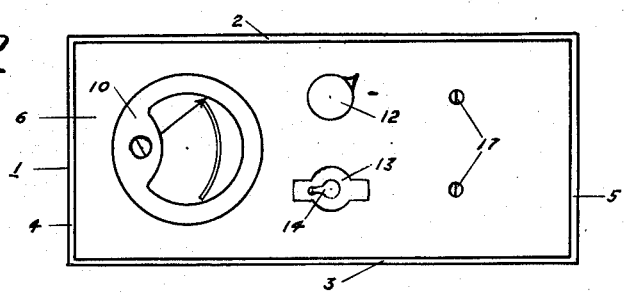
Fig. 2 is a plan view of the structure shown in Fig. 1.

Referring principally to Figs. 1 and 2, I represents a case or box made up of the side walls 2 and 3, the end walls 4 and 5 and the top 6. The bottom 7 of the box is removably secured to the end and side walls by means of the screws 8.

Figure 3:
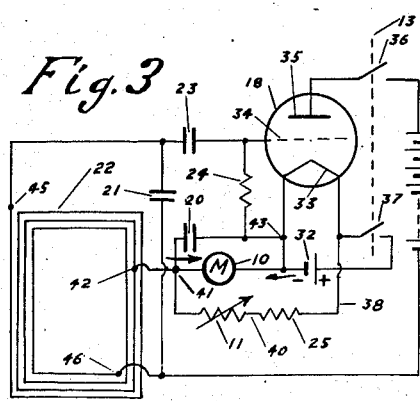
Fig. 3 is a circuit diagram employing a filament cathode triode and a rectangular pickup coil.

The top or instrument panel of the box is provided with an opening in which to receive the direct current milliammeter 10, which in the particular circuit shown is arranged to read the total of one milliampere owing to the size of the triode and the circuit employed. Immediately adjacent the milliammeter the top is provided with a variable resistor 11 controlled by the knob 12. Immediately adjacent the resistor is a double pole switch 13 arranged to be operated by the switch lever 14. Beyond the switch 13 and the resistor 11 the top is arranged to support a triode socket 15 by means of the insulating post 16 secured by the mounting screws 17. The socket in turn is arranged to carry the vacuum tube 18 having a base 19 with the proper number and arrangement of prongs for connecting the elements of the tube with the socket 15. This apparatus also includes the condenser 20 arranged to be connected across the terminals of the milliammeter 10, the condenser 21 arranged to be connected across the terminals of the pickup coil 22, and the condenser 23 in series with the grid connection to the pickup coil 22. This circuit also employs the use of a grid leak 24 and a fixed resistor 25. The whole of this apparatus is connected as illustrated in Fig. 3 and is disposed within the upper chamber 26 of the box 1 above the fixed bottom 27 which is provided the hole 28 through which the tube 18 extends permitting the same to be replaced without disturbing the rest of the circuit. The lower chamber 30 of the box, which is enclosed by the removable bottom 7, is also arranged to contain the B battery 31 and the A battery 32 which may be held in place by suitable clips and are provided with leads for connecting the same into the circuit of the apparatus enclosed in the upper chamber 26.

Referring to the circuit diagram of Fig. 3 it will be noted that the tube 18 is of the filament type having a cathode 33 and the grid 34 and the plate element or anode 35. The double pole switch 13 is provided with the contacts 36 and 37 arranged to open the B and A battery circuits respectively, the positive terminal of the B battery 31 being connected through the switch point 36 to the anode 35 and the positive terminal of the A battery 32 being connected through the switch point 37 to the wire 38 that is connected to one side of the cathode 33 and to one end of the resistor 25. The other end of the resistor 25 is connected by means of the wire 40 to one side of the variable resistor 11. The other side of the variable resistor 11 is connected to the wire 41 which in turn is connected to one side of the milliammeter 10, one side of the condenser 20, and to the center tap 42 of the pickup coil 22. The other side of the milliammeter 10 and the condenser 20 is connected by means of the wire 43 to the other side of the cathode 33 into the negative of the A battery 32. One side of the grid leak 24 is connected to the wire 43 and the other side is connected directly to the grid and to the condenser 23. The other side of the grid condenser 23 is connected to the end 45 of the pickup coil 22 the opposite end 46 of which is connected to the negative side of the B battery 31. The opposite sides of the condenser 21 are connected between the terminals of the pickup coil 22.

The circuit connection just described is energized by the closing of the switch points 36 and 37 of the switch 13 which creates an electronic flow from the filament or cathode 33 to the grid and plate circuits. This electronic flow is traced from the plate 35 through the switch 36, the B battery 31, the terminal 46 of the pickup coil 22 to the center tap 42, the wire 41, the meter 10, and return to the cathode 33. The electronic flow through the grid circuit may likewise be traced from the cathode 33 to the grid 34, the wire 44, the grid leak 24, to the cathode and also the wire 44, the condenser 23, the terminal 45 of the pickup coil 22 and return through the mid-tap 42 of the pickup coil 22, the wire 41, the meter 10 and return to the cathode 33. This electronic flow through the meter 10 by the tuned plate and grid circuits is opposed by a counter-electronic flow from the negative side of the A battery 32 through the meter 10 in the opposite direction, the wire 41, the resistors 11 and 25 in series, the wire 38, the switch point 37 and return to the positive side of the A battery 32. The electronic flow through the meter 10 by reason of the tuned grid and anode circuits thereby provides a positive reading on the milliammeter 10 and the electronic flow in the reverse direction from the A battery 32 provides a negative current reading of the milliammeter 10.

When the inductance of the pickup coil 22 and the condensers 20, 21 and 23 are properly selected to provide a tuned circuit the switch 13 may be closed to energize the triode and the variable resistor 11 is then adjusted to provide zero current through the milliammeter 10, the currents flowing in opposite directions balancing one another thereby providing a zero reading on the meter. When the pickup coil is brought into close proximity to metal, either magnetic or non-magnetic, the metal has the effect of decreasing the impedance of the pickup coil reducing the flow of grid current and permitting an increased electronic flow through the anode circuit. This increased electronic flow of plate current provides a positive reading on the milliammeter. If the pickup coil of the detector is grought into close proximity of the metal the electronic flow of the anode circuit is correspondingly increased causing the hand of the meter to accordingly register an increased flow of current and as the pickup coil is drawn away from the metal the electronic flow decreases and the hand of the meter returns to zero.

Figure 4:
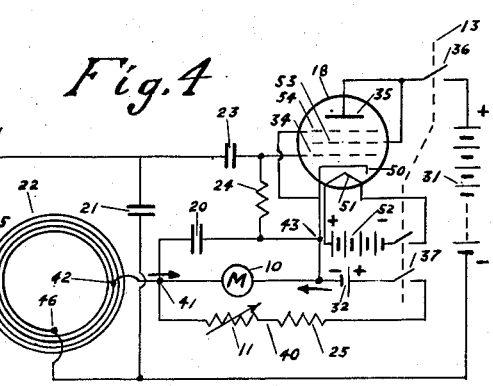
Fig. 4 is a circuit diagram supplying a heated cathode pentode and a circular pickup coil.

The circuit illustrated in Fig. 4 is the same as that of Fig. 3 except that the vacuum tube employed is a pentode connected as a triode and is provided with the cathode 50 heated by the heating element 51 that may be energized from any suitable source such as the battery 52. The screen grid 53 is connected to the anode and the suppressor grid 54 is connected to the cathode. In all other respects the circuit is the same as that shown in Fig. 3. Connecting the pentode as a triode as shown provides a more sensitive detecting circuit with a greater indication.

The pickup coil 47 is formed circular in place of rectangular in order to provide for the maximum coupling with a metal object of substantially the same perimetral shape. The terminals 42, 45 and 46 of the pickup coil may be in the form of plugs arranged to be received by complementary sockets in the end wall 5 of the box 1. Although only two shapes of the pickup coil are shown it is desirable to employ the pickup coil in the shape substantially the same as the object to be located. The rectangular coil as shown in Figs. 1 and 2 is designed for use in locating the rectangular metal outlet boxes of an electrical system that may have been covered by the plaster board and plaster in the finished room of a house or building. The rectangular pickup coil is substantially of the same physical dimension as the rectangular outlet box. When the detector is moved along closely adjacent the plastered wall and it comes within the close proximity of the outlet the hand of the meter will immediately register a high current flow. However, when the detector is moved around until the pickup coil is in substantial registration with the rectangular outlet box a maximum current reading will be indicated on the meter 10. Slight movement of the box in any direction will decrease this current reading. Owing to the fact that the rectangular pickup coil is substantially the same dimension as that of the outlet box a pencil may be employed to trace the marginal edge of the end 5 of the box on the plaster or boarded surface of the wall. When the detector is removed the operator can cut the finished wall with safety and find the outlet box disposed in exact alignment with the pencil lines that he drew on the surface of the wall.

If it is desired to locate a circular or hexagonally shaped outlet box the circular pickup coil 47 of Fig. 4 may be employed in place of the rectangular coil. The impedance of these coils of course is substantially the same and will provide the same electronic flow giving the same reading.

Although it is preferable to employ a pickup coil that has substantially the same shape as that of the object being searched, however another shaped coil will indicate the presence of metal. It may be difficult to find the exact center of the object, owing to the fact that configuration of the coil and the object is different. If the object does not exactly match the coil the current reading indicated on the milliammeter will be of less degree because the field of the coil will not be equally affected by the metal object being searched.

It is highly desirable to properly tune the grid and anode circuits of this device and proportion the rates of electronic flow through the meter so that the detector, when drawn several inches away from the surface of the wall, will not register the presence of the metallic object. This is advantageous to the operator as there is no doubt in his mind that the maximum intensity of the field causing current flow registered by the meter is affected only when the pickup coil matches the object and then only when the pickup coil is in relatively close proximity to the object. In other words, other metallic objects have substantially little or no effect on the reading of the milliammeter unless it is in close proximity to a selected object thereby providing a high degree of accuracy in detecting the concealed metal.

The particular advantage of the removable false bottom 7 permits the one to replace the triode 18 or either one of the batteries 31 and 32 without otherwise disturbing the circuit. When the false bottom 7 is in position it protects the triode from injury.

I claim:

1. A detecting apparatus for locating a hidden metal object which comprises a vacuum tube having an anode, cathode and control grid, a pickup coil with an intermediate tap, a B battery, a connection from the anode through the B battery to one end of the pickup coil, a grid condenser, a connection from the grid through the grid condenser to the other end of said pickup coil, a grid leak connected from the grid to the cathode, a second condenser connected in multiple with the pickup coil, a current reading device connected between the cathode and the intermediate tap of the pickup coil, an A battery, a circuit to connect the A battery to supply energy to the cathode and to supply through the current reading device a current flow in a direction opposite to the current flow induced by the B battery, a variable resistor in said A battery circuit, and switch means having independent interruptors to open the B and A battery circuits.

2. The structure of claim 1 which also includes a condenser, and a connection placing said condenser in multiple with said current reading device.

FRANK M. SHOEMAKER.

REFERENCES CITED

The following references are of record in the file of this patent:

UNITED STATES PATENTS

| Number | Name | Date |
|---|---|---|
| 1,126,027 | Jullig | Jan. 26, 1915 |
| 1,431,638 | Dowling | Oct. 10, 1922 |
| 2,018,080 | Martienssen | Oct. 22, 1935 |
| 2,048,591 | Berry | July 21, 1936 |
| 2,160,356 | Fore | May 30, 1939 |
| 2,220,070 | Aiken | Nov. 5, 1940 |
| 2,242,312 | Machts | May 20, 1941 |
| 2,412,782 | Palmer | Dec. 17, 1946 |